July 30, 1940.　　　T. D. SAUNDERS　　　2,209,936
GLASSWARE MOLD
Filed March 29, 1938　　　2 Sheets-Sheet 1

Inventor
Thomas D. Saunders,
By Royal E. Burnham,
Attorney

July 30, 1940.  T. D. SAUNDERS  2,209,936
GLASSWARE MOLD
Filed March 29, 1938   2 Sheets-Sheet 2
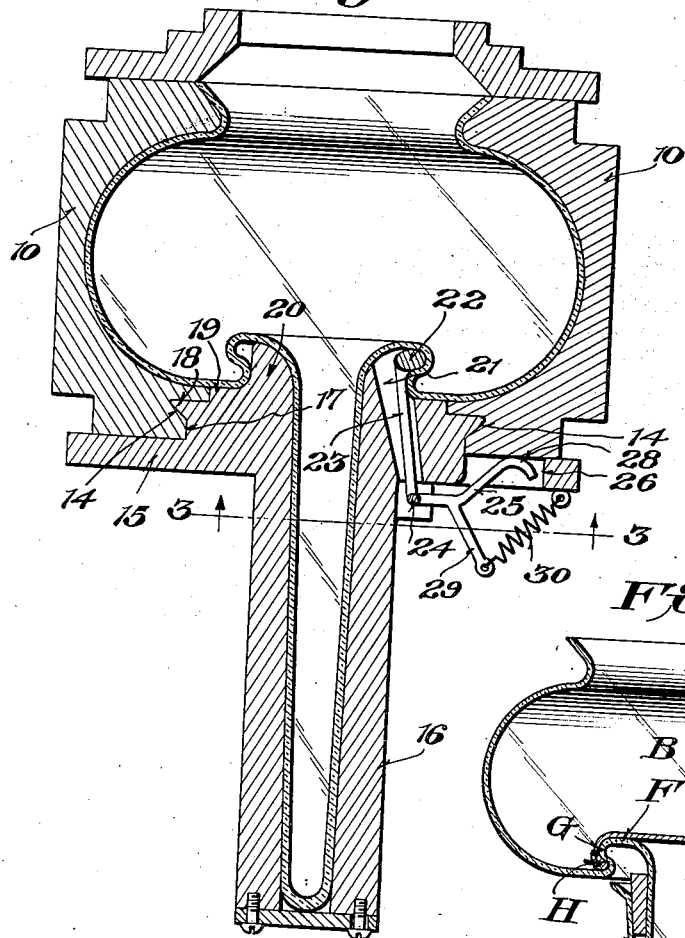
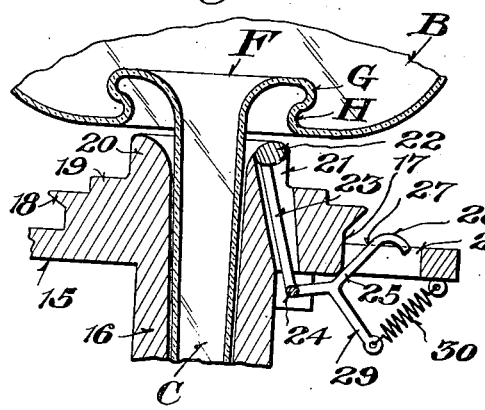
Inventor
Thomas D. Saunders,
By Royal E. Burnham,
Attorney Patented July 30, 1940

2,209,936

UNITED STATES PATENT OFFICE 2,209,936

GLASSWARE MOLD

Thomas D. Saunders, Dunbar, W. Va., assignor to Dunbar Glass Corporation, a corporation of West Virginia Application March 29, 1938, Serial No. 198,742

8 Claims. (Cl. 49—69)

This invention relates to mold formation of glassware of shapes that make it difficult, and sometimes impossible, to withdraw the article from the molds without breakage, unless special precautions are taken.

It is an object of the invention to provide a mold in which glass articles of this character may be formed to shape by a blowing method and from which they easily may be withdrawn without much resistance by mold parts, whereby breakage is avoided.

When considered with the description herein, characteristics of the invention are apparent in the accompanying drawing, forming part hereof, wherein an adaptation of the invention, for production of articles of the kind hereinafter particularly referred to, is disclosed for purposes of illustration.

While the disclosures herein exemplify what now is considered to be a preferable embodiment of the invention, it is to be understood that it is not the intention to be limited necessarily thereto in interpretation of the claims, as modifications and adaptations within the limits of the claims can be made without departing from the nature of the invention.

Like reference characters refer to corresponding parts in the views of the drawing, of which—

Fig. 4 is a vertical section on the line 4—4, Fig. 1;
Fig. 5 is a fragmentary vertical section;

Fig. 6 is a sectional view of a utensil having an upper stemmed bowl such as may be made in the device.

Figure 1:
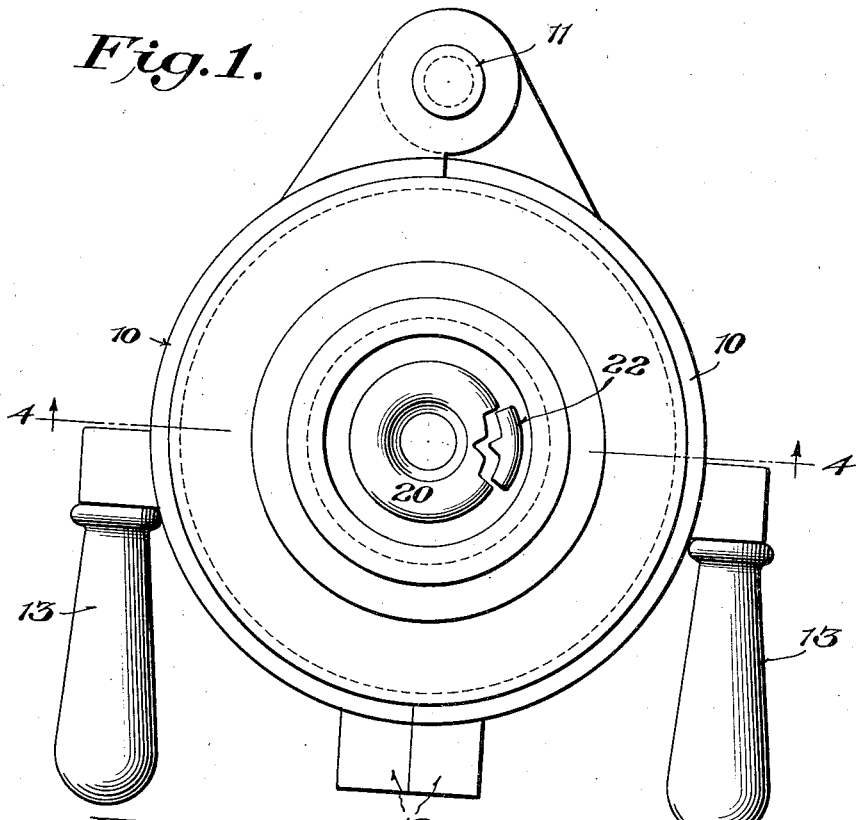
Fig. 1 is a top view of the device;
Figure 2:
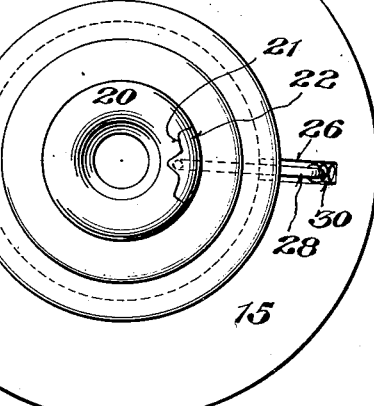
Fig. 2 is a top view, the upper mold parts being omitted.
Figure 3:
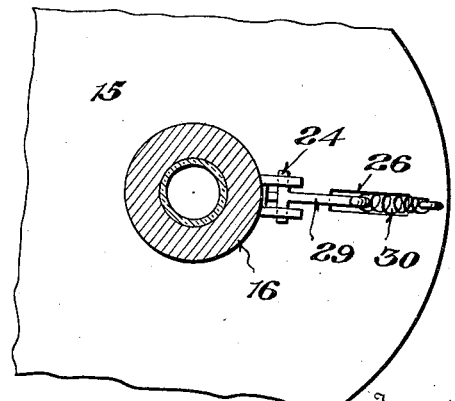
Fig. 3 is a section on the line 3—3, Fig. 4.

The invention particularly is adapted for use in production of articles such as the upper stemmed bowls of coffee-makers of the kind illustrated by Fig. 6, which is disclosed for better understanding of the mold characteristics.

Such a utensil includes a lower bowl A to contain water, an upper bowl B to contain ground coffee, and a hollow somewhat tapered stem C integrally formed with and extending downwardly from the bottom of the upper bowl into the lower bowl and nearly to the bottom of the latter. The stem is disposed through a sealing member D in the neck of the lower bowl. A filter-cloth E in the bottom of the upper bowl extends across the end of the stem-passage. In order to afford means for holding the filter-cloth in place, the bottom of the upper bowl is raised as a circular protuberance F at its juncture with the stem, and it is formed with a radially-extending shoulder G below which there is an annular groove H for accommodation of a draw string or spring ring to engage and hold the filter-cloth. When heat is applied to the lower bowl and vapor generated therein, water is forced upwardly through the stem into coffee in the upper bowl. After removal of the lower bowl from heat action and on condensation of the vapor therein, the infusion in the upper bowl is drawn down through the stem into the lower bowl.

In making these stemmed upper bowls, difficulty has been met in withdrawing them upwardly from the mold because of disposition of a mold part in the groove behind the filter-retaining annular shoulder. The mold of this invention avoids that difficulty.

The mold includes a pair of upper separable mold sections 10 shaped inside in conformity with the bowl of the article to be formed therein, and they are hinged at 11 in any suitable manner. They have lugs 12 for cooperation with means well known in the art for holding them closed, and handles 13 are provided for opening and closing the sections. The mold sections are formed at their bases with an annular internal substantially V-shaped groove 14. The mold sections 10 are capable of sliding opening and closing movement on a flat base part 15.

A mold 16, to form the somewhat tapered stem of the bowl, extends downwardly from the base 15, and it also protrudes above the base as a circular centrally-positioned mold part 17, around which is formed the raised portion of the bottom of the bowl for holding the filter-cloth. The mold part 17 has an annular radially-extending flange 18 near its base, which seats in the groove 14 of the upper mold sections when they are closed to give the requisite close joint of the parts.

Above the flange 18, the mold part 17 has a ledge 19 against the side of which the edges of the upper mold parts above the groove abut when those parts are closed, the top of the ledge then constituting a continuation of the upper mold surface. The mold part 17 above the ledge is a top portion 20 shaped in conformity of the interior of the raised part of the bowl bottom, and it has an approximately flat top with a rounded peripheral corner.

The mold top 20 has a recess or seat 21 in its side for accommodation of a mold element 22 for formation of the filter-retaining shoulder of the bowl. This element has an arcuate outer edge of approximately the same curvature as the upper part of the mold top 20, and its upper surface usually is in the same pane as that of the mold top. The mold element 22 is shiftable laterally in the seat. The arrangement is such that, when it is retracted, its outer edge is substantially in the circumference of the side wall of the mold top. It is shiftable outwardly to the extent required for formation of a shoulder of the size desired.

The mold element 22 is mounted on the upper part of a lever arm 23 that extends downwardly to a fixed pivotal point of the lever at 24 below the base 15. A member 25 of the lever on the other side of the pivot extends laterally and upwardly into a radial slot 26 in the base, in which slot the member has a curved or bowed portion 27 that affords an inclined upper surface 28. Another member 29 of the lever, on the same side of the pivot as member 25, has a spring 30 connected therewith, the spring also being connected with a fixed part as with the base as shown. Urge of the spring tends to keep the mold element 22 retracted and the bowed portion 27 of the lever above the upper surface of the base 15.

When the mold sections are being closed to form a mold cavity, one of them in its sliding movement on the base rides over the inclined surface 28 of the lever member 25, depresses that member, and swings the lever to project the mold element 22. The mold section holds the mold element in projected position while it remains closed. The parts are coordinated so that the mold element is held projected the amount necessary for formation of a shoulder of the desired overhang.

If it is desired to change the amount of projection of the mold element 22 to give the shoulder more or less overhang, that may be done by adjustment of the lever. For example, the bowed portion 27 of the lever may be bent to give it more or less protrusion above the base 15 when the mold sections 10 are open so that when one of those sections rides over it when closing the lever is rocked more or less and corresponding more or less protrusion of the mold element effected.

In the closed formation of articles in the device, a batch of glass in plastic condition on a blow-pipe is blown and expanded in the upper mold against the side thereof to form the bowl and down into the lower mold to form the attached stem. During the blowing, the glass is rotated by twisting the blow-pipe, to produce the desired smoothing action, and also for formation of the circular filter-retaining shoulder over the end of the mold element 22. It has been found in practical use of the mold that sufficient turning movement of the glass against the projecting end of that element readily may be accomplished to form that shoulder continuously around the periphery of the raised portion of the bowl bottom while the glass is plastic.

When the article is to be withdrawn from the mold for subsequent finishing, the upper mold sections are opened, the lever then is released, and the spring 30 rocks the lever and retracts the mold element 22. Thus that element is released and withdrawn from the inside of the filter-retaining shoulder, and the article is free to be withdrawn from the mold without danger of breakage at the shoulder.

I claim:

1. A device for blowing formation of glassware comprising a mold part, separable side mold members mounted adjacent to said mold part and movable to close therearound to form a mold cavity therewith, a mold element pivotally mounted adjacent to said mold part and swingable to projection from and retraction to the side thereof, yieldable means continuously and retractively urging said mold element toward said mold part, and means operable by one of said side mold members during its closing movement to project said mold element from said mold part.

2. A device for blowing formation of glassware comprising a base, a mold part extending above said base, separable side mold members on said base movable thereon to close around the lower portion of said mold part to form a mold cavity therewith, a mold element pivotally mounted adjacent to said mold part and movable laterally toward and from said mold part, and means operable by one of said mold members during its closing movement to project said mold element from said mold part.

3. A device for blowing formation of glassware comprising a base, a mold part extending above said base, separable side mold members on said base movable thereon to close around the lower portion of said mold part to form a mold cavity therewith, a mold element pivotally mounted adjacent to said mold part and movable laterally toward and from said mold part, yieldable means continuously and retractively urging said mold element toward said mold part, and means operable by one of said mold members during its closing movement to project said mold element from said mold part.

4. A device for blowing formation of glassware comprising a base having a slot, a mold part extending above said base, separable side mold members on said base movable thereon to close around the lower portion of said mold part to form a mold cavity therewith, a mold element movable laterally to and outwardly from said mold part, a member on which said mold element is mounted pivoted adjacent to said mold part, means urging said pivoted member in one direction, and an arm on said pivoted member extending into said base slot and having an inclined surface normally above the surface of said base depressible by one of said side mold members during its closing movement to move said pivoted member in the opposite direction.

5. A device for blowing formation of glassware comprising a mold part having a lateral recess, separable side mold members mounted adjacent to said mold part and movable to close therearound to form a mold cavity therewith, a mold element pivotally mounted adjacent to said mold part and movable laterally in said recess, yieldable means continuously and retractively urging said mold element inwardly in said recess, and means operable by one of said side mold members during its closing movement to move said mold element outwardly in said recess.

6. A device for blowing formation of glassware comprising a base, a mold part extending above said base having a lateral recess, separable side mold members on said base movable thereon to close around the lower portion of said mold part to form a mold cavity therewith, a mold element pivotally mounted adjacent to said mold part movable laterally in said recess, and means operable by one of said side mold members during its closing movement to move said mold element outwardly in said recess.

7. A device for blowing formation of glassware comprising a base having a slot, a stem mold having a part above said base formed with a lateral recess, separable side mold members on said base movable thereon to close around the lower portion of said stem mold part to form a mold cavity therewith, a mold element movable laterally in said recess, a member pivoted adjacent to said stem mold on which said mold element is mounted, means exerting retractive effort on said pivoted member, and an arm on said pivoted member extending into said base slot and having an inclined surface normally above the surface of said base depressible by one of said mold members during its closing movement to move said mold element outwardly in said recess.

8. A device for formation of glassware comprising a base, a mold part extending above said base, separable side mold members on said base movable thereon to close around said mold part to form a mold cavity therewith, a mold element movable toward and from said mold part, a member on which said mold element is mounted pivoted adjacent to said mold part, means urging said pivoted member in one direction, and an arm on said pivoted member having an inclined surface contactable by one of said side mold members during its closing movement to move said pivoted member in the opposite direction.

THOMAS D. SAUNDERS.